3,459,826
OLEFIN OLIGOMERIZATION
Kenneth W. Barnett, San Leandro, and John H. Raley,
Walnut Creek, Calif., assignors to Shell Oil Company,
New York, N.Y., a corporation of Delaware
No Drawing. Filed Apr. 9, 1968, Ser. No. 719,857
Int. Cl. C07c 3/20, 3/10
U.S. Cl. 260—683.15                                    5 Claims

ABSTRACT OF THE DISCLOSURE

An improved olefin oligomerization process employs a heterogeneous catalyst composition produced by contacting nickelocene and elemental hydrogen in the presence of an inorganic oxide catalyst support.

BACKGROUND OF THE INVENTION

A variety of oligomerization catalysts, both homogeneous and heterogeneous, has been employed to convert, i.e., oligomerize, lower olefins to olefinic products of higher molecular weight, e.g., to dimer, trimer, tetramer or the like. However, the scope of operable olefinic reactants as well as the character and relative proportions of the product mixture components are greatly dependent upon the particular catalyst employed. One homogeneous process is that of Tsutsui et al., J. Polymer Sci., A-1, 5, 681 (1967), which employs nickelocene, i.e., bis(cyclopentadienyl)nickel, as the catalyst. This process, however, is useful only for the conversion of ethylene, and higher olefinic reactants are not suitably employed. A related process of Walker et al., U.S. 3,134,824, issued May 26, 1964, employs nickelocene supported on silica-alumina as catalyst. This composition, however, is relatively inactive at moderate temperatures, e.g., at or below 100° C., although the oligomerization product mixture does contain relatively large proportions of desirable trimer and tetramer products in contrast to the process of Tsutsui et al. which yields essentially only olefin dimer product. It would be of advantage, however, to obtain a product mixture of equivalent or more desirable composition by a process conducted at moderate reaction temperatures.

SUMMARY OF THE INVENTION

It has now been found that an improved process of oligomerizing lower olefins is obtained through the use of a catalyst composition produced by contacting nickelocene and elemental hydrogen in the presence of an inorganic oxide catalyst support. The oligomerization process is characterized by a high rate of olefin conversion at moderate temperatures.

DESCRIPTION OF PREFERRED EMBODIMENTS

The process of the invention contemplates, broadly speaking, intimately contacting a lower olefin, in a liquid reaction environment, with a heterogeneous catalyst composition comprising a nickel compound derived from nickelocene employed in conjunction with an inert inorganic oxide support. The precise chemical form of the nickel compound is not known with certainty and the catalyst composition is best defined in terms of its method of production. The catalyst composition results from the intimate contact of nickelocene and elemental hydrogen in the presence of the catalyst support.

The catalyst support is a normally solid inorganic oxide support, preferably consisting essentially of one or more metal oxides, which contains a major proportion of at least one metal oxide component selected from silica and alumina. Such materials are commonly known as refractory oxides and include synthetic materials as well as acid-treated clays or the crystalline aluminosilicates known in the are as molecular sieves. Synthetic refractory oxides are preferred over naturally occurring materials or molecular sieves and exemplary synthetic refractory oxides include silica, alumina, silica-alumina, silica-magnesia, tungsten oxide-alumina, tungsten oxide-silica-alumina, boria-alumina, silica-alumina-zirconia, molybdenum oxide-silica-alumina, and silicia-titania-zirconia. Preferred refractory oxide supports are siliceous refractory oxides, that is, refractory oxides containing silica as the major component, and particularly preferred as the siliceous refractory oxide is silica-alumina.

No special pretreatment of the support prior to contact with hydrogen and the nickelocene is required, but better results are obtained if the support has been calcined at temperatures from about 450° C. to about 600° C. for a period of from about 6 hours to about 24 hours prior to the formation of the catalyst composition.

The catalyst compositions are produced by contacting the support, nickelocene and elemental hydrogen, preferably in a liquid reaction diluent, thereby apparently serving to reduce, i.e., hydrogenate, the nickelocene and concomitantly impregnating the catalyst support with at least a moiety derived from the "reduced nickelocene."

The relative proportion of nickelocene to be contacted with hydrogen and the catalyst support is not critical so long as sufficient nickel-containing catalyst component is introduced onto the support to allow adequate olefin/catalyst contact during the olefin oligomerization process in which the catalyst composition is employed. Amounts of nickelocene to be employed in the production of the catalyst composition are suitably from about 1% by weight to about 10% by weight, preferably from about 3% by weight to about 8% by weight based on the catalyst support.

To insure adequate contact of the catalyst support, the nickelocene and elemental hydrogen, the catalyst composition is preferably produced in the presence of an inert liquid reaction diluent. Illustrative of such diluents are the hydrocarbons and aromatic halohydrocarbons free from aliphatic unsaturation such as hexane, heptane, octane, decane, dodecane, cyclohexane, tetrahydronaphthalene, benzene, toluene, xylene, chlorobenzene and bromobenzene. Preferred reaction diluents comprise the aliphatic saturated alkanes of from 6 to 12 carbon atoms. Amounts of reaction diluent up to about 20 times the weight of the catalyst support are typically employed.

Catalyst production is most conveniently effected by charging to a reactor the nickelocene, the catalyst support and the reaction diluent, pressurizing the reactor with hydrogen and maintaining the reaction mixture at elevated temperature and pressure until catalyst composition production is complete, typically a period of three hours or less. Suitable temperatures for catalyst composition production are from about 50° C. to about 150° C. with the temperature range from about 75° C. to about 125° C. being preferred. Initial hydrogen pressures from about 200 p.s.i.g. to about 800 p.s.i.g. are satisfactory.

Subsequent to its production, the catalyst composition is separated from the reaction diluent by conventional techniques such as filtration or decantation. In most instances, such a separation is not employed and the mixture and the mixture is employed directly in the oligomerization process wherein a reaction diluent of the same character is also utilized.

The catalyst compositions of the invention are characterized by oligomerization activity with regard to a variety of lower olefins. In general, lower hydrocarbon olefins of from 2 to 10 carbon atoms, having either internal or terminal ethylenic unsaturation are satisfactory, e.g., ethylene propylene, 1-butene, 2-hexene, 3-octene, 1-decene and 2-decene. Preferred olefin feeds, however, are hydrocarbon monoolefins of 2 to 8 carbon atoms which are straight-chain α-olefins. Particularly suitable are the 1-alkenes of 2 to 5 carbon atoms, i.e., ethylene, propylene, 1-butene and 1-pentene.

The olefin oligomerization process is conducted by contacting, in nongaseous phase, the olefin and the catalyst composition, preferably in the presence of an inert reaction diluent. As previously stated, in one modification the catalyst composition is not separated from the diluent in which it was produced and that diluent suitably serves as the reaction medium for olefin oligomerization. In the instances where the catalyst composition was separated, reaction diluent such as that previously described is added to the olefin oligomerization reaction mixture. In certain modifications of the process, a portion of the oligomer product serves as at least a portion of the reaction diluent and less added reaction diluent is required. In most instances, however, the diluent of catalyst composition production is employed in the oligomerization process in amounts up to about 5 moles of diluent per mole of olefin reactant. Moreover, the process is conducted in an inert reaction environment so that the reaction conditions are substantially anhydrous and substantially oxygen-free.

The precise method of establishing olefin-catalyst contact is not critical. In one modification, the catalyst composition and the diluent are charged to an autoclave or similar pressure reactor, the olefin feed is introduced, and the reaction mixture is maintained with agitation at reaction temperature and pressure for the desired reaction period. Another modification comprises passing, in a continuous manner, the olefin feed in a liquid-phase solution in the reaction diluent through a reaction zone in which the catalyst composition is maintained. By any modification, the oligomerization process is conducted at moderate temperatures and pressures. Suitable reaction temperatures vary from about 20° C. to about 200° C., but preferably from about 20° C. to about 100° C. The reaction is conducted at or above atmospheric pressure. The precise pressure is not critical, so long as the reaction mixture is maintained substantially in a nongaseous phase. Typical pressures vary from about 1 atmosphere to about 80 atmospheres with the range from about 2 atmospheres to about 35 atmospheres being preferred.

At the conclusion of reaction, the product mixture is separated and the oligomer products are recovered by conventional methods such as fractional distillation, selective extraction, adsorption and the like. The reaction diluent, the catalyst composition and any unreacted olefin feed are recycled for further utilization.

The olefin oligomer products are materials of established utility and many are chemicals of commerce. The oligomer products, which remain ethylenic in character, are converted by conventional "Oxo" processes to aldehydes which are hydrogenated with conventional catalysts to the corresponding alcohols. Alternatively, the olefins are converted to secondary and tertiary alcohols as by sulfuric acid-catalyzed hydration. The $C_{12}$–$C_{20}$ alcohols thereby produced are ethoxylated as by reaction with ethylene oxide in the presence of a basic catalyst, e.g., sodium hydroxide, to form conventional detergents, and the lower molecular weight alcohols are esterified by reaction with polybasic acids, e.g., phthalic acid, to form plasticizers for polyvinyl chloride.

To further illustrate the improved process of the invention and the novel catalyst composition therefor, the following examples are provided. It should be understood that the details thereof are not to be regarded as limitations as they may be varied as will be understood by one skilled in this art.

EXAMPLE I

A catalyst composition was prepared by charging to an 84 ml. autoclave 2 grams of a commercial silica-alumina (25% alumina), 20 ml. of heptane and 0.1 g. of nickelocene. The mixture was hydrogenated for one hour at 100° C. under 500 p.s.i. initial hydrogen pressure. Subsequent to the venting of unreacted hydrogen, the reactor was flushed twice with nitrogen and 200 p.s.i. of ethylene was admitted at room temperature, whereupon an exothermic reaction took place. Several repressurings gave the same results. The product mixture was removed and analyzed by gas-liquid chromatographic techniques. The results of this run are reported in Table I under Run 1.

The same procedure was employed to produce a nickelocene supported on silica-alumina catalyst composition which was not subjected to hydrogenation. This catalyst composition was contacted with ethylene at an elevated temperature to afford the results reported in Run 2 of Table I.

TABLE I

| Run | 1 | 2 |
|---|---|---|
| Total ethylene, g | 6.2 | 10.9 |
| Conditions: | | |
| Temperature, ° C | 25–60 | 25–75 |
| Time, min | 30 | 60 |
| Pressure, p.s.i.g. (max.) | 200 | 350 |
| Reaction rate, g. oligomer/g. catalyst/hr | 6.2 | 0 |
| Olefin conversion, percent | 100 | 0 |
| Selectivity, percent: | | |
| $C_4$ | 50 | |
| $C_6$ | 34 | |
| $C_8$ | 12 | |
| $C_{10}$ | 4 | |
| Linearity of olefin product, percent: | | |
| $C_6$ | 59 | |
| $C_8$ | 37 | |

EXAMPLE II

By the procedure of Example I, a catalyst composition was produced and contacted with 1-butene. The reaction conditions employed and the analysis of the product are reported as Run 1 of Table II.

For purposes of comparison, a supported nickelocene catalyst composition of essentially the same nickel content was produced (no hydrogenation) and employed to oligomerize 1-butene. The reaction conditions employed and the analysis of the product mixture are reported as Run 2 of Table II.

TABLE II

| Run | 1 | 2 |
|---|---|---|
| Total 1-butene, g | 9.3 | 10.0 |
| Reaction conditions: | | |
| Temperature, ° C | 70 | 70 |
| Time, min | 20 | 60 |
| Pressure, p.s.i.g. (max.) | 40 | 40 |
| Conversion to oligomer, percent | 69 | 0.2 |
| Reaction rate, g. oligomer/g. catalyst/hr | 9.6 | |
| Selectivity, percent: | | |
| $C_8$ | 88 | 100 |
| $C_{12}$ | 12 | 0 |

EXAMPLE III

Ethylene was oligomerized employing the reduced nickelocene catalyst on several supports. In each case, 0.1 g. of nickelocene was contacted with a slurry of 2.0 g. of the support in heptane and the mixture was hydrogenated for one hour at 100° C. under 50 p.s.i. initial hydrogen pressure. As was the case in the procedure of Example I, the hydrogen was vented and the reactor was flushed with nitrogen prior to introduction of the ethylene. The results of this series of runs are reported in Table III wherein the term "Run" identifies the catalyst in terms of its support, the preparations of which are described below.

A. A silica-alumina support containing 10.3% tungsten oxide.

B. A catalyst support produced by total impregnation of a calcined alumina with a aqueous solution of ammonium metatungstate. Calcination at 450° C. afforded a white, free-flowing solid of approximately 12% wt. tungsten oxide.

TABLE III

| Run | A | B |
|---|---|---|
| Total ethylene, g | 6 | 11.3 |
| Reaction conditions: | | |
|   Temperature, °C | 20–30 | 30–50 |
|   Time, min | 50 | 150 |
|   Pressure, p.s.i.g. (max.) | 300 | 500 |
| Conversion to oligomer, percent | 100 | 79 |
| Selectivity, percent: | | |
|   $C_4$ | 50 | 69 |
|   $C_6$ | 37 | 22 |
|   $C_8$ | 10 | 6 |
|   $C_{10}$ | 3 | 2 |
| Linearity of product, percent: | | |
|   $C_6$ | 53 | 82 |
|   $C_8$ | 29 | 77 |

EXAMPLE IV

A catalyst composition was produced by the procedure of Example I and was employed to oligomerize 8.8 g. of propylene at a temperature of 25–30° C. and a maximum pressure of 100 p.s.i. for 0.5 hour. The propylene conversion was 91% with a selectivity to $C_6$ product of 87%, an 11% selectivity to $C_9$ product and a 2% selectivity to $C_{12}$ product.

We claim as our invention:

1. The process of oligomerizing olefins by intimately contacting, in substantial absence of hydrogen, in non-gaseous phase at a temperature from about 20° C. to about 200° C., lower hydrocarbon olefin of from 2 to 10 carbon atoms and a catalyst composition produced by intimately contacting (a) an inert, inorganic oxide catalyst support, (b) from about 1% by weight to about 10% by weight, based on said support of nickelocene, and (c) elemental hydrogen, in an inert reaction diluent at a temperature from about 50° C. to about 150° C. and a hydrogen pressure from about 200 p.s.i.g. to about 800 p.s.i.g.

2. The process of claim 1 wherein the olefin is a straight-chain α-olefin of 2 to 8 carbon atoms and said catalyst support is a siliceous refractory oxide.

3. The process of claim 2 wherein the siliceous refractory oxide is silica-alumina and the temperature of said contacting of the olefin and the catalyst composition is from about 20° C. to about 100° C.

4. The process of claim 3 wherein the olefin is ethylene.

5. The process of claim 3 wherein the olefin is 1-butene.

References Cited
UNITED STATES PATENTS

| | | | |
|---|---|---|---|
| 2,999,075 | 9/1961 | Pruett | 260—439 |
| 3,121,729 | 2/1964 | Fischer et al. | 260—439 |
| 3,163,682 | 12/1964 | Walker et al. | 252—431 |

PAUL M. COUGHLAN, Jr., Primary Examiner

U.S. Cl. X.R.

252—430